(12) United States Patent
Annau

(10) Patent No.: US 10,029,223 B2
(45) Date of Patent: Jul. 24, 2018

(54) APPARATUS AND METHOD FOR PRODUCING AN ORBITAL MOVEMENT IN A PLANE FOR A FLUID SAMPLE

(71) Applicant: Niels Annau, Straubenhardt (DE)

(72) Inventor: Niels Annau, Straubenhardt (DE)

(73) Assignee: STRATEC Biomedical AG, Birkenfeld (DE)

( * ) Notice: Subject to any disclaimer, the term of this patent is extended or adjusted under 35 U.S.C. 154(b) by 825 days.

(21) Appl. No.: 14/506,642

(22) Filed: Oct. 4, 2014

(65) Prior Publication Data

US 2015/0098300 A1   Apr. 9, 2015

(30) Foreign Application Priority Data

Oct. 4, 2013   (GB) .................................. 1317593.0

(51) Int. Cl.
*B01F 15/00*   (2006.01)
*B01F 9/00*   (2006.01)
*F16H 1/32*   (2006.01)

(52) U.S. Cl.
CPC ...... *B01F 15/00448* (2013.01); *B01F 9/0001* (2013.01); *B01F 9/0014* (2013.01); *B01F 15/00487* (2013.01); *F16H 1/32* (2013.01); *B01F 2009/0074* (2013.01); *B01F 2015/00584* (2013.01); *F16H 2001/327* (2013.01)

(58) Field of Classification Search
CPC .......... B01F 15/00448; B01F 15/00487; B01F 15/00467; B01F 2009/0074; B01F 9/0001; B01F 9/0016; F16H 2001/327; F16H 2001/323; F16H 2001/328; F16H 1/32

USPC .............................................................. 74/87
See application file for complete search history.

(56) References Cited

U.S. PATENT DOCUMENTS

| 4,954,832 A * | 9/1990 | Grant ..................... F16H 21/14 |
| | | 342/352 |
| 5,066,135 A * | 11/1991 | Meyer ................. B01F 11/0014 |
| | | 366/208 |
| 6,769,838 B2 * | 8/2004 | Potts ..................... E01C 19/286 |
| | | 404/117 |
| 9,604,185 B2 * | 3/2017 | Buse ................. B01F 15/00837 |
| 2011/0286298 A1 | 11/2011 | Zamirowski et al. | |
| 2015/0011348 A1 * | 1/2015 | Vester ................. B01F 11/0014 |
| | | 475/175 |

FOREIGN PATENT DOCUMENTS

| GB | 1348603 A | 3/1974 |
| GB | 228875 A | 11/1995 |
| WO | 9803804 | 1/1998 |
| WO | 2013113849 | 8/2013 |

* cited by examiner

*Primary Examiner* — David C Mellon
(74) *Attorney, Agent, or Firm* — 24IP Law Group; Timothy R DeWitt

(57) ABSTRACT

An apparatus (10) for producing an orbital movement in a plane (20) is disclosed. The apparatus (10) comprises a lower shaft (40) and an upper shaft (30), being parallelly and eccentrically attached to one another, and a platform (50) mounted on the upper shaft (30). A ring gear (60) is attached to the platform (50) and coaxially rotatable about the upper shaft (30). A gear wheel (80) is coaxially rotatably mounted on the lower shaft (40) and engages with the ring gear (60).

6 Claims, 4 Drawing Sheets

APPARATUS AND METHOD FOR PRODUCING AN ORBITAL MOVEMENT IN A PLANE FOR A FLUID SAMPLE

CROSS-REFERENCE TO RELATED APPLICATIONS

None

BACKGROUND OF THE INVENTION

Field of the Invention

The field of the invention relates to an apparatus and method for producing an orbital movement in a plane, particularly for shaking and/or rotating a fluid sample.

Brief Description of the Related Art

Existing systems are known for creating an orbital shaking movement for ensuring that particles in fluids in sample holders do not settle down at the bottom of a container forming the sample holder.

Existing systems are also known that use a belt for driving one or more pulleys and having two shafts. A first one of the shafts is coaxial to the main axis of the pulley and is located on one of the flat sides of the pulley. A second one of the shafts is located on an opposite flat side of the pulley with an offset to the main axis. These pulleys are mounted with a coaxial shaft in a structure, which does not orbit, and with the other shafts in an orbiting structure, which orbits when a drive motor drives the belt. The orbiting structure can be attached to or be part of a platform on which the sample holders can be placed. These prior art systems often have two or more eccentric shaft pulleys to support the weight of the sample holders including the fluid samples.

The prior art systems often include a counterweight to balance the orbiting mass. The center of counterweight needs to be aligned at 180° to the center of gravity of the orbiting parts. A mechanism or method is needed to ensure alignment of the rotation angles of the pulleys and the counterweight.

The sample holders of the prior art need to be moved to a so-called pipetting position reachable by a pipettor to be filled or emptied. The structure with the sample holders is rotated by a second motor to move the sample holder for filling or emptying to the pipetting position. In an alternative manner, the sample holders can be placed on a rectangular plate for positioning the sample holders to the pipetting position with a second motor moving the rectangular plate in an X- and Y-direction.

Another system is known which uses a planetary drive with round holders for the sample holders. The planetary drive comprises a plurality of small gear wheels, which orbit around a larger gear wheel. The orbiting movement of the gear wheels and the movement of the sample holders into the pipetting position is carried out by the same motor. The motor turns the supporting structure carrying the sample holders on its upper surface and the corresponding small gear wheels on the lower surface in a manner such that the fluid holders and the gear wheels can rotate about a common axis. The small gear wheels engage with a fixed center wheel. The sample holders turn about their own axis and orbit the center wheel at the same time when the planetary drive is in operation. Thus, the fluid in the sample holders is moved sufficiently to prevent particles from settling down at the bottom of the sample holder. The sample holders can be placed in the required pipetting position.

It is known that the belts of the prior art systems are prone to failure from elongation and excessive wear over time. This problem can be aggregated in high temperature environments. The belt drive systems and the planetary drive systems of the prior art also require a certain amount of space for their operation. In particular, the planetary drive system requires a separate holder for each one of the sample holders. Thus, there is a limitation on the maximum number of sample holders that can be placed on the system or the required space may be too large in order to enable high performance system specifications. It is also known that belt drives require more maintenance in general than the gear wheel drives. The belt drives can also be more difficult and time-consuming to assemble. There is also a risk of wrong assembly.

One of the further issues associated with the planetary drive is that it does not allow positioning of the sample holders without shaking the fluids in the sample holders and this can lead to difficulties with pipetting in a short time frame.

SUMMARY OF THE INVENTION

An apparatus for producing an orbital movement in a plane of a sample holder is disclosed. The apparatus comprises an eccentric shaft with a lower shaft and an upper shaft. The lower shaft and the upper shaft are parallelly and eccentrically attached to one another. A platform is rotatably mounted on the upper shaft. A ring gear is attached to the platform and is also able to coaxially rotate about the upper shaft. The ring gear comprises a plurality of interior teeth on radially inward facing circumferential surface. A gear wheel having a plurality of exterior teeth on a peripheral circumferential surface is arranged to be coaxially rotatably mounted on the lower shaft. The gear wheel and the ring gear are so placed that at least some of the plurality of interior teeth engage with at least some of the plurality of exterior teeth.

This arrangement allows the epicycloid and rotary movement of the platform to produce orbital shaking and enable stopping of the sample holders in a correct position for pipetting. The apparatus requires little space and can operate in high-temperature environments, as the eccentric shaft can be driven by a motor attached to the lower shaft.

In one aspect of the invention the ring gear can be independently driven either by a further gear wheel engaging with teeth on the lower part of the gear wheel or by a pulley.

The platform and ring gear may be formed as one piece.

The apparatus may comprise a counterweight connected to the upper shaft.

The apparatus may further comprises a sample holder mounted on the platform.

The apparatus may further comprise a first transmission device for driving the lower shaft to rotate coaxially.

The first transmission device may be pulley coaxially attached to the lower shaft, or a first transmitting gear wheel coaxially attached to the lower shaft.

The apparatus may further comprise a second transmission device for driving the gear wheel to rotate coaxially.

The second transmission device may be a pulley coaxially attached to the gear wheel or a second transmitting gear wheel coaxially attached to the gear wheel The apparatus may further comprise a first motor operatively connected to the first transmission device.

The apparatus may further comprise a second motor operatively connected to the second transmission device.

A method for producing an orbital movement in a plane of at least one fluid sample on a platform is disclosed. The method comprises driving interior teeth of a ring gear attached to the platform to roll off exterior teeth of a gear wheel; driving the ring gear to rotate about its center; and superposing the rolling off and the rotating of the ring gear

DETAILED DESCRIPTION OF THE INVENTION

The invention will now be described on the basis of the drawings. It will be understood that the embodiments and aspects of the invention described herein are only examples and do not limit the protector's scope of the claims in any way. The invention is defined by the claims and their equivalents. It will be understood that features of one aspect or embodiment of the invention can be combined with the feature of a different aspect or aspects and/or embodiments of the invention.

Figure 1:
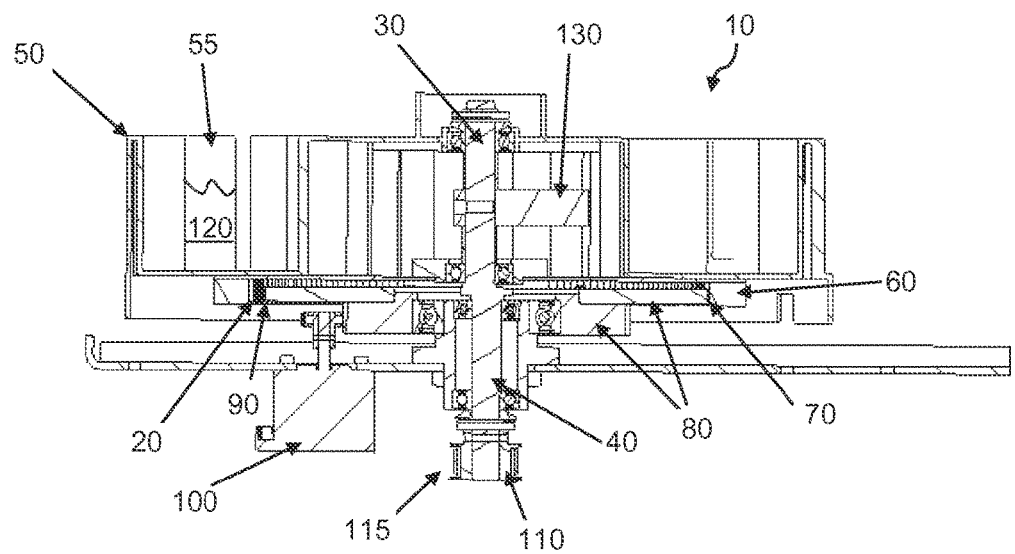
FIG. 1 shows an example of the apparatus.

FIG. 1 shows an example of the apparatus 10 of this disclosure. The apparatus 10 is used to produce an orbital movement, such as a shake or rotation, in a plane indicated by the reference numeral 20 in FIG. 1.

The apparatus 10 comprises an eccentric shaft having an upper shaft 30 and a lower shaft 40 about which is attached a platform 50. The platform 50 can rotate co-axially about the upper shaft 30. The platform 50 is mounted on a ring gear 60 having interior teeth 70. The interior teeth 70 engage with exterior teeth 90 of a gear wheel 80. The platform 50 and the ring gear 60 could be made from a single piece. One or more sample holders 55 can be mounted on the platform 50. A drive wheel 110 is connected to the lower shaft 40 to rotate the lower shaft 40. The drive wheel 110 is connected by a belt driven pulley 115 to a drive motor (not shown).

Figures 2A, 2B:
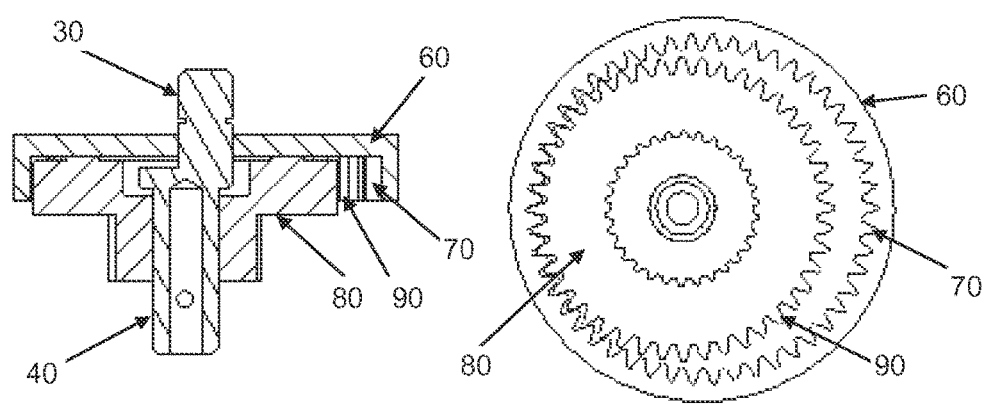
FIGS. 2A-C show an example of the eccentric shaft, and the ring gear and the gear wheel in a cross section (FIG. 2A) and a bottom view (FIG. 2B). The offset of the eccentric shaft is shown in FIG. 2C.
Figure 2C:
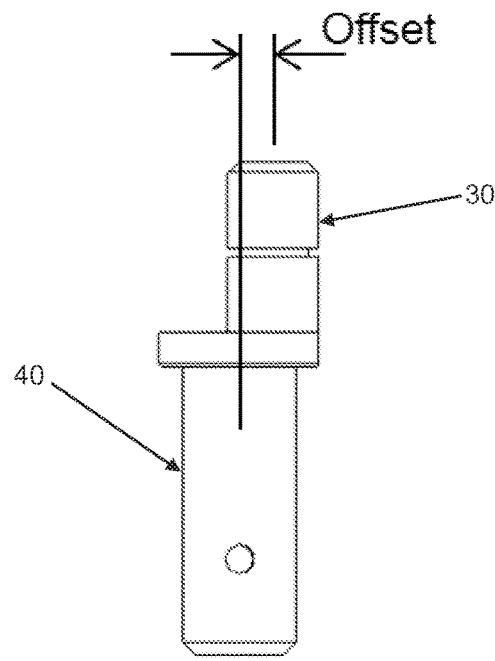

FIGS. 2A-C show an example of the eccentric shaft 30, 40, in cross section (FIG. 2A) and in a bottom view (FIG. 2B) of the eccentric shaft illustrating the interior teeth 70 and the exterior teeth 90. FIG. 2C shows the eccentric shaft 30, 40 with an offset marked. The same reference numerals are used in FIGS. 1 and 2.

It will be seen from FIG. 2B that some of the exterior teeth 90 engage with some of the interior teeth 70.

Figures 3A, 3B:
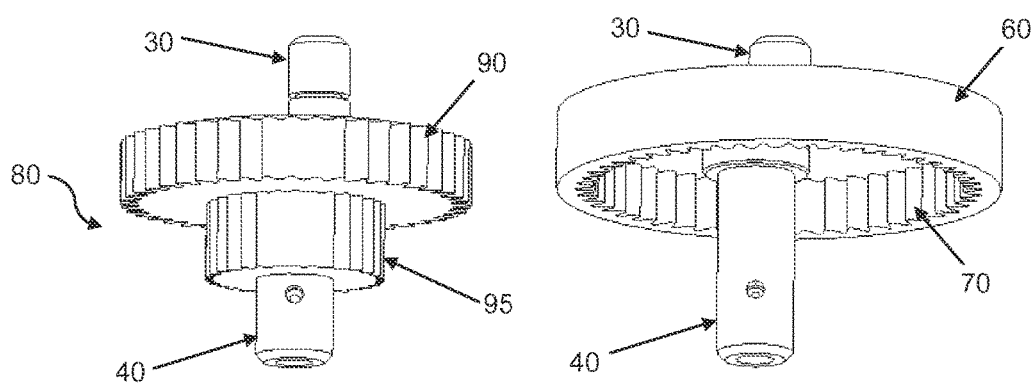
FIGS. 3A and 3B show the gear wheel with the exterior teeth and drive teeth (FIG. 3A) and the ring gear within the eccentric shaft (FIG. 3B).

FIGS. 3A show an example of the gear wheel 80 mounted on the eccentric shaft 30, 40. It will be seen that the gear wheel 80 has drive teeth 95, which can engage with a set of gears (rather than the belt driven pulley 115) to drive the gear wheel 80. FIG. 3B shows a further example of the eccentric shaft 30, 40 about which is located the ring gear 60 with the interior teeth 70. It will be understood from FIGS. 3A-B that the gear wheel 80 can be mounted inside the ring gear 60 such that some of the interior teeth 70 engage with some of the exterior teeth 90, as shown in FIG. 2B. The ring gear and the gear wheel 80 are pivot-mounted on the shaft 30 and it is therefore possible to rotate the eccentric shaft 30, 40 without rotating the gear wheel 80.

The apparatus 10 may require a counterweight 130 if the system exceeds a certain size and balancing of centrifugal forces is required. The counterweight 130 is attached to the upper shaft 30 in such a way that it is able to counter act the centrifugal forces exerted on the apparatus 10.

Figures 4A, 4B, 4C:
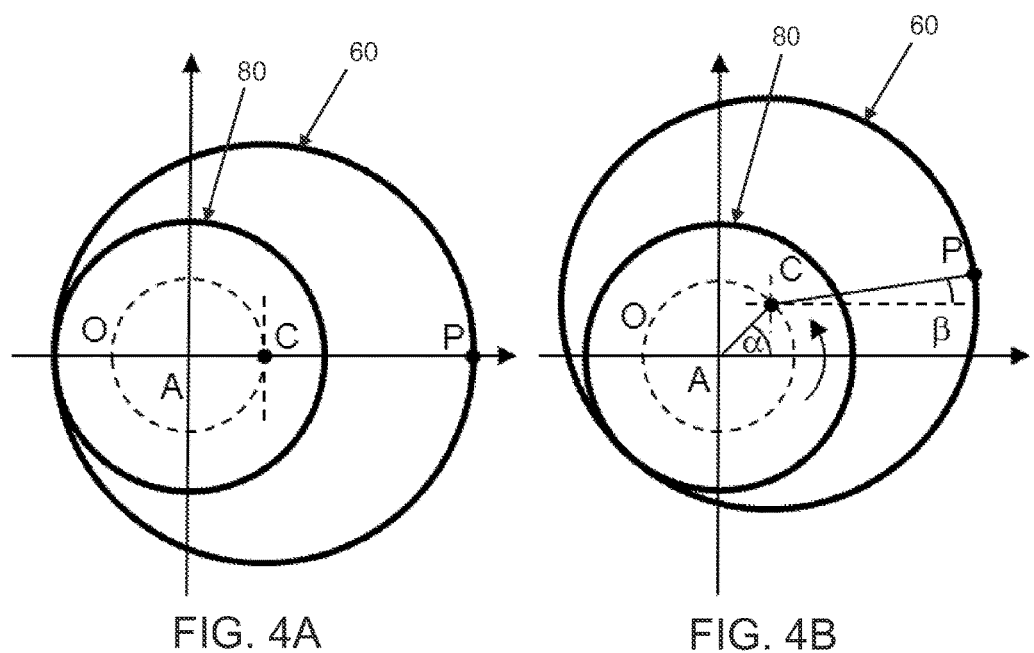
FIGS. 4A-C show an example of the orbital shaking.

An example of the orbital movement of the apparatus 10 is shown in FIGS. 4A-B. This aspect of the invention assumes that the gear wheel 80 is not rotated, but that the eccentric shaft 30, 40 is rotated by the drive wheel 110. The center C of the larger ring gear 60 circles the axis A of the gear wheel 80. The radius of this circle O (shown as a dotted line) equals the offset of the eccentric shaft 30, 40, as shown in FIG. 2C. The interior teeth 70 of the ring gear 60 roll off the exterior teeth 90 of the gear wheel 80 and thus the ring gear 60 also turns about its axis. This turning means that the angle of rotation α of the eccentric shaft 30, 40 changes faster than the angle of rotation β of the ring gear 60. A point P on the ring gear 60 thus moves on a path shown in FIG. 4B about the axis A of the gear wheel 80. FIG. 4C shows the movement of the gear wheel 80 and the ring gear 60 with respect to each other.

Figure 5C:
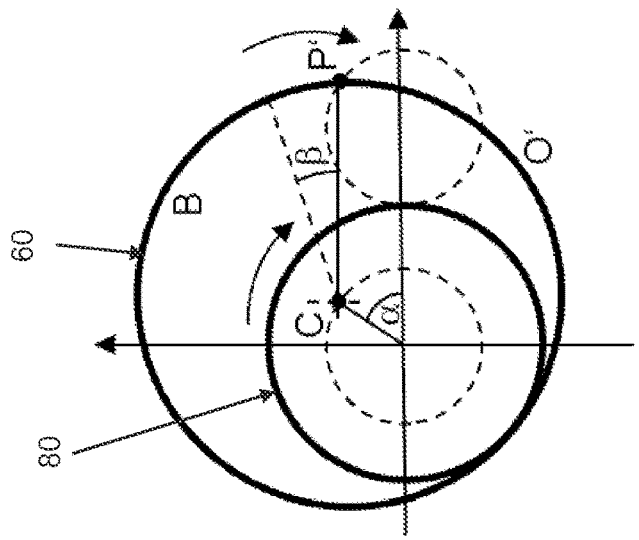
FIGS. 5A-C show a further example of the shaking.
Figure 5B:
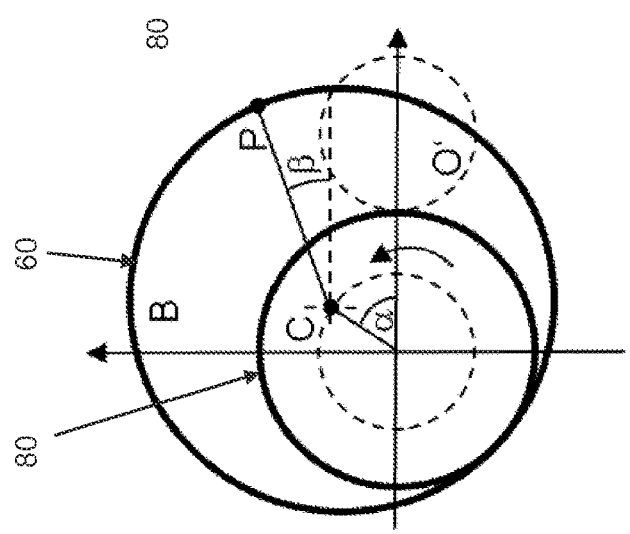
Figure 5A:
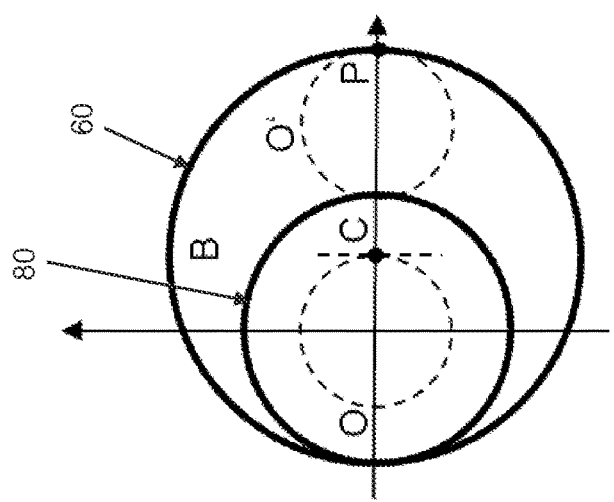

FIGS. 5A-C show a second aspect of the rotation in which the gear wheel 80 is also driven. The ring gear 60 is rotated about its center C. Thus, the point P on the ring gear 60 can travel at any position on the circular path B. It was noted in connection with FIG. 4 that the circle O equals the offset of the eccentric shaft 30, 40. This is represented by a virtual circle O' in FIG. 5B. Thus, any point can be moved to any position at the intersection of the circle B and the virtual circle O'.

An orbital shaking movement is therefore produced when the eccentric shaft 30, 40 rotates continuously and the gear wheel 80 simultaneously rotates in an opposite direction. It will be appreciated that the rotational speed of the gear wheel 80 needs to be adapted to the speed of the ring gear 60 according to the transmission ratio of the ring gear 60 and the gear wheel 80. The point P then travels on the virtual circular path O' through which the eccentric shaft 30, 40 rotates. The diameter of the virtual circle O' equals the diameter of the circle O and therefore the offset of the eccentric shaft 30, 40 and the center of the virtual circle O' always stay in the same position. The platform 50 is attached to the ring gear 60 and therefore follows this movement. An orbital shaker for fluid samples 120 in the sample holder 55 is therefore created.

In a further aspect of the invention, a pipettor can be used to reach the platform 50 for adding and/or removing fluid samples 120 from the sample holder 55. The sample holder 55 needs to be positioned on the platform 50 reachable by the pipettor. The rotation of the eccentric shaft 30, 40 and the position of the ring gear 60 therefore needs to be coordinated such that the sample holders 55 are stopped in a position reachable by the pipettor.

A sensor could be located on the lower shaft 40 to detect the rotation angle of the lower shaft 40. This allows the drive wheel 110 to place the offset of the upper shaft 30 in a particular position so that the sample holder 55 can then be placed in the pipetting position reachable by the pipettor by rotating the gear wheel 80 on the upper shaft 30.

In one aspect of the invention it would be possible also to add a stirring mechanism to stir the fluid samples 120.

REFERENCE NUMERALS

10 Apparatus
20 Plane
30 Upper Shaft

40 Lower Shaft
50 Platform
55 Sample Holder
60 Ring Gear
Interior Teeth
80 Gear Wheel
90 Exterior Teeth
95 Drive Teeth
100 Drive Motor
110 Drive Wheel
115 Belt Driven Pulley
120 Fluid Sample
130 Counterweight

What is claimed is:

1. An apparatus for producing an orbital movement in a plane, the apparatus comprising:
   a lower shaft and an upper shaft being parallelly and eccentrically attached to one another;
   a platform rotatably mounted on the upper shaft;
   a ring gear attached to the platform and coaxially rotatable about the upper shaft, the ring gear comprising a plurality of interior teeth on a radially inward circumferential surface;
   a gear wheel, having a plurality of exterior teeth on a peripheral circumferential surface, being coaxially rotatably mounted on the lower shaft, wherein the gear wheel is so placed within the ring gear that at least some of the plurality of interior teeth engage with at least some of the plurality of exterior teeth;
   a first transmission device for driving the lower shaft;
   a first motor operatively connected to the first transmission device;
   a second transmission device for driving the gear wheel; and
   a second motor operatively connected to the second transmission device.

2. The apparatus according to claim 1, wherein the platform and the ring gear are formed as one piece.

3. The apparatus according to claim 1, further comprising a counterweight connected to the upper shaft.

4. The apparatus according to claim 1, further comprising a sample holder mounted on the platform.

5. The apparatus according to claim 1, wherein the first transmission device for driving the lower shaft to rotate comprises one of a pulley coaxially attached to the lower shaft and a first transmitting gear wheel coaxially attached to the lower shaft.

6. The apparatus according to claim 5, wherein the second transmission device for driving the gear wheel comprises a pulley coaxially attached to the gear wheel or a second transmitting gear wheel coaxially attached to the gear wheel.

* * * * *